fluorination of U-Th-oxide (U:Th~1:20)

hydrofluorination of U-Th-oxide (U:Th~1:20)

United States Patent Office 3,720,748
Patented Mar. 13, 1973

3,720,748
METHOD FOR RECOVERING URANIUM AS URANIUM HEXAFLUORIDE
Joachim Massonne, Hannover, Rolf Kreutz, Bemerode, and Heinz Friedrich, Konstanz (Bodensee), Germany, assignors to Kali-Chemie Aktiengesellschaft, Hannover, Germany
Continuation-in-part of application Ser. No. 805,140, Mar. 7, 1969. This application May 15, 1969, Ser. No. 824,963
Claims priority, application Germany, May 18, 1968, P 17 71 401.1; Mar. 9, 1968, P 16 67 847.0; Mar. 21, 1968, P 17 67 015.4
Int. Cl. C01g 43/06
U.S. Cl. 423—4
21 Claims

ABSTRACT OF THE DISCLOSURE

Uranium is recovered as the hexafluoride from coated or uncoated nuclear fuel by reacting the fuel at a temperature of at least 500° C. with a mixture of oxygen and gaseous hydrogen fluoride followed by reaction with elementary fluorine at 500 to 750° C.

---

Figure 2:
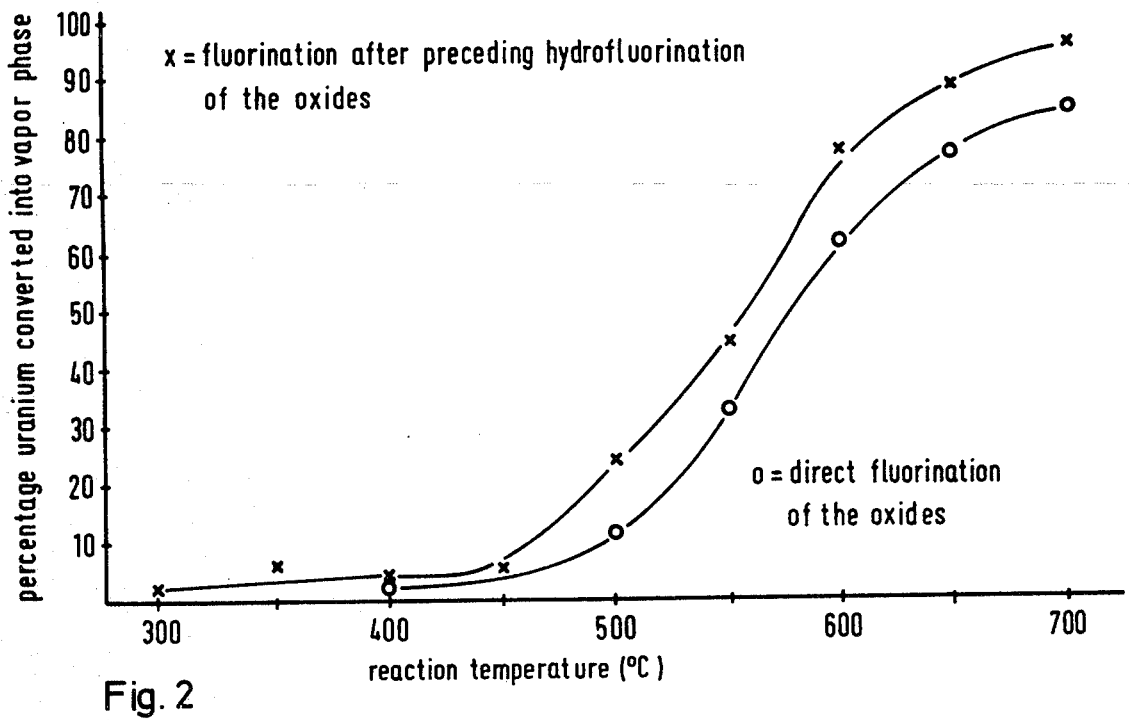

This application is a continuation-in-part of our application Ser. No. 805,140 filed Mar. 7, 1969, and now abandoned.

BACKGROUND OF INVENTION

(1) Field of invention

The present invention relates to methods for recovering uranium as uranium hexafluoride from coated or uncoated nuclear fuels containing uranium and thorium. It can be applied to such nuclear fuels which are coated with pyrocarbon and/or silicon carbide.

Nuclear fuels and breeding materials, as used for example as high temperature fuels, consist of spherical oxidic or carbidic particles. These are often sealed in a gas-tight manner by coating with pyrocarbon (PyC) and/or silicon carbide. Vis-a-vis a pure PyC coating, a coating consisting of silicon carbide or one containing silicon carbide and PyC has much greater powers of retention as regards solid fission products, so that nuclear fuels coated in this manner become specially suitable for high temperature reactors in which electrical energy is produced using gas turbines driven by a gas circuit.

On economic grounds it is necessary to separate the uranium present in the spent fuel or breeding materials from thorium and the fission products, for the production of new fuel elements. The uranium content of particles when freed of the coating can be between 2 and 20% by weight, in accordance with the composition of the starting material. Usually the uranium content is only a few percent and the thorium content is very considerably in excess.

(2) Description of the prior art

In accordance with known methods the first step in the treatment of irradiated nuclear fuel materials has been that of removing the coating before uranium recovery takes place in a separate process step. While in the case of a PyC coating in accordance with the known method the carbon coating could be burnt off with oxygen or oxygen containing gases, in the case of the recovery treatment of fuel elements coated with SiC, or SiC and PyC, no satisfactory method has been found for removing the coating because a SiC coating is extraordinarily stable both chemically and thermally. Even at temperatures in the order of 1000° C. the silicon carbide is only oxidised superficially to $SiO_2$ with oxygen. Any carbon layer lying underneath remains untouched. Methods in which the SiC coating is mechanically destroyed, decomposed at 2200° C., partially decomposed at 2600° C. by a thermal shock treatment, converted into $SiCl_4$ by chlorinating at 1000° C., or dissolved by alkaline melts, are very difficult to carry out from the process engineering point of view. Furthermore in the case of these known methods it is always necessary to remove pyrocarbon in a separate working step.

After the removal of the coating, recovery of uranium from such nuclear fuels has entailed dissolving the particles, for example in aqueous acids, and subsequent liquid-liquid extraction of the uranium using organic solvents. Disadvantages of this method are that the radioactive waste occurs in a very dilute form and the organic solvents can be decomposed in time by the radiation.

In accordance with a further prior proposal, the uranium was to be converted into the vapor phase by direct fluorination of the oxidic particles so as to produce uranium hexafluoride which could then be separated. However, it was difficult to control the strongly exothermic reactions. An uncontrolled raise in temperature would result in the uranium yield decreasing owing to an increased sintering together of particles. Attempts have already been made to improve the uranium hexafluoride yield by carrying out the reaction in the presence of aluminum oxide particles in a fluidised bed and diluting the fluorine, at least in the initial phase, with nitrogen. However, even this manner of operation did not provide a certain remedy to the problem of lumps forming during sintering. These measures also failed to provide any approximately complete recovery of uranium. A further disadvantage of the method was the large consumption of relatively expensive fluorine.

In accordance with a further known proposal uranium was to be removed from uranium dioxide-thorium dioxide mixtures by dissolving the mixtures in alkali metal fluoride melts at about 600° C., the melts having a high zirconium fluoride content. After this, treatment was carried out with hydrogen fluoride and fluorine. In such melts, for example $NaF$—$ZrF_4$ or $LiF$—$NaF$—$ZrF_4$ melts, thorium dioxide and uranium oxides dissolve by reacting with zirconium fluoride in accordance with the following equations:

(1) $ThO_2 + ZrF_4 \rightarrow ThOF_2 + ZrOF_2$
(2) $ThO_2 + 2ZrF_4 \rightarrow ThF_4 + 2ZrOF_2$
(3) $UO_2 + 2ZrF_4 \rightarrow UF_4 + 2ZrOF_2$ Following this hydrogen fluoride is introduced into the melt so that the oxyfluorides are converted into the tetrafluorides:

(4) $ThOF_2 + ZrOF_2 + 4HF \rightarrow ThF_4 + ZrF_4 + 2H_2O$

There results a clear melt from which uranium can be removed as the hexafluoride by the introduction of fluorine:

(5) $UF_4 + F_2 \rightarrow UF_6$

This method has some substantial disadvantages. It is extremely difficult to overcome the problem of corrosion in the case of hydrofluorination in the salt melt form. Owing to the simultaneous presence of hydrogen fluoride and water (see Equation 4) at comparatively high temperatures corrosive attack of most metals is extremely pronounced, so that only a few metals or alloys can be used as container materials. Furthermore if temperatures of 600° C. are not exceeded, the alkali metal fluoride-zirconium fluoride melts can only take up 15 to 20% by weight of thorium-uranium oxides, so that, more especially in the case of fuels with low uranium contents, large quantities of radioactive waste are produced. Finally the uranium, which is present in a highly diluted form, can only be driven out slowly and incompletely by the passage of fluorine through the melt as uranium hexafluoride.

SHORT SUMMARY OF THE INVENTION

The method in accordance with the invention for recovering uranium as the hexafluoride from uranium and thorium containing nuclear fuels with or without a coating of pyrocarbon and/or silicon carbide is chararterised in that the uncoated or coated nuclear fuel is heated at a temperature of at least 500° C., preferably between 600 and 800° C., with a mixture of orygen and gaseous hydrogen fluoride, and subsequently by reaction with elementary fluorine at 500 to 750° C., preferably 600 to 750° C., the uranium hexafluoride is freed.

The simultaneous action of oxygen, or a gas containing free oxygen, and gaseous hydrogen fluoride effects the quantitative removal of any SiC coating present even at temperatures not higher than about 500° C. Any carbon derived from the PyC coating is combusted as well owing to the presence of oxygen. All reaction products are gaseous. The hydrogen fluoride in the gaseous mixture can make up 0.5 to 90% by weight, the preferred amount being 5 to 25% by weight. Owing to the dependence of the reaction time on the particle size, it is preferable to carry out comminution, more particularly in the case of coated coarse-particle nuclear fuels, before treatment with the gaseous mixture. On economic grounds the particle size should not exceed 1 mm., and preferably 300 to 800μ.

The presence of oxygen in the gaseous mixture is important from a number of different points of view. Using hydrogen fluoride alone, it is not possible to remove the silicon carbide layer at temperatures below 800° C. It is only when about 10% by weight of oxygen and more are present that the decomposition and removal of the SiC layer can be successfully carried out. This also involves the destruction of the PyC coating. Uncoated, non-comminuted ceramic uranium carbide-thorium carbide mixtures are converted, for example, into uranium oxide-thorium oxide mixtures which can be attacked by hydrogen fluoride on treatment with oxygen alone. The particles substantially retain their original spherical form, but such spherical particles are very unstable from the mechanical point of view and easily decompose into a brownish-black powder. Furthermore ceramic oxide particles are only attacked by hydrogen fluoride in the presence of oxygen. The presence of oxygen therefore simultaneously brings about an activation of the oxidic and carbidic particles so that they can be attacked by the gaseous hydrogen fluoride and be caused to pass over into the fluoride mixtures. It is supposed that the uranium is partially converted into a higher stage of oxidation which leads to lattice disturbances and a higher degree of readiness to react chemically.

Dependently of the quantity of hydrogen fluoride contained in the oxygen-hydrogen fluoride mixture, the method in accordance with the invention gives oxidic nuclear fuel particles which contain tetrafluorides of uranium and/or of thorium to a greater or lesser extent. By reaction of these products with elementary fluorine at temperatures between 500 and 750° C., the uranium hexafluoride can be freed. The reaction then corresponds, for example, with the following equation:

(6) 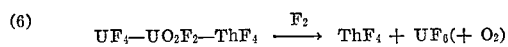

It has been found that the treatment with elementary fluorine becomes increasingly easy and simply to carry out with an increasing degree of conversion of the oxidic nuclear fuel particles with hydrogen fluoride into

mixtures. Preferably the oxidic nuclear fuels are caused to pass over into UF$_4$—UO$_2$F$_2$—ThF$_4$ mixtures to at least 60%. If the hydrogen fluoride in the oxygen hydrogen fluoride mixture and/or the treatment time are not sufficient with this mixture, it is preferred to carry out, after treatment with this gaseous mixture, a treatment with gaseous hydrogen fluoride at temperatures between 400 and 700° C., more particularly between 400 and 500° C. The reaction then corresponds with the following equations:

(7) 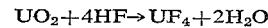

(8) 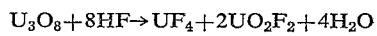

(9) 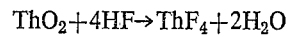

The reaction of gaseous hydrogen fluoride with the uranium oxide-thorium oxide mixtures exhibits a pronounced temperature maximum at 450° C. (see FIG. 1 of the drawings accompanying this specification). In the hydrofluoridation the particles break down into a loose, freely flowing powder. By a suitable choice of the reaction time a nearly complete reaction can be carried out so that the oxide mixture is completely converted into the corresponding fluoride mixture. For the following treatment with fluorine this is not strictly necessary, but a substantial conversion into the fluoride mixture leads to an economy in the use of elementary fluorine.

In the case of the absence of a silicon carbide layer, that is to say in the case of uncoated ceramic oxidic or carbidic particles, such as is the case also with a surrounding PyC layer, it may be an advantage from the process point of view to carry out the treatments with oxygen and with hydrogen fluoride separately, that is to say the particles are treated with oxygen at temperatures between 500 and 1200° C., the activated uranium oxide-thorium oxide mixtures are converted at temperatures between 400 and 700° C. with gaseous hydrogen fluoride into UF$_4$—UO$_2$F$_2$—ThF$_4$ mixtures to at least 60%, and the fluorination with elementary fluorine is carried out subsequently. For treatment with oxygen temperatures between 700 and 1000° C. are preferred. By carrying out the treatment for a number of hours a good degree of activation is usually attained.

More particularly in the case of high uranium contents, it may be necessary to dilute the mixtures which are to be hydrofluorinated or fluorinated with inert solid substances such as fluor spar, or sintered corundum which are useful for removing the heat of reaction. The carrying out of the method in accordance with the invention can be in apparatus conventional for solid-gas reactions, such as fixed bed reactors, rotary furnaces, shaft furnaces or fluidised bed furnaces, made of corrosion-resistant materials such as nickel, nickel alloys or sintered aluminum oxide.

For carrying out fluorination with elementary fluorine in accordance with Equation 6, the powdery fluoride mixture can be used directly. It is, however, also possible and advantageous from different points of view to dissolve the mixture produced following hydrofluorination at temperatures between 500 and 650° C. in a melt of a mixture thereof with an alkali metal fluoride salt, such as a melt comprising lithium fluoride, sodium fluoride, lithium-sodium fluoride, lithium-potassium fluoride, sodium-potassium fluoride or lithium-sodium-potassium fluoride before fluorination and then pass the elementary fluorine into the mixture obtained. Thorium fluoride, which is mostly present in the mixtures, forms binary, ternary, quarternary or complex mixtures at temperatures between 500 and 650° C. in the mixtures. The proportion of thorium in such mixtures is very high.

The amount of uranium fluorides and of fission elements to be dissolved can then be ignored owing to the small quantity present. In the melts which contain only alkali metal fluorides, between approximately 70 and 85% by weight thorium fluoride can be dissolved. Furthermore it is also possible to use alkali metal fluorides in the melts with further admixed fluorides, such as zirconium fluoride, beryllium fluoride or zinc fluoride. Such complex melt systems frequently have a high capacity for dissolving thorium tetrafluoride and low melting point phases. Systems with a high content of zirconium tetrafluoride are hardly suitable since at temperatures below 650° C. they only have a limited capability for dissolving thorium tetrafluoride. It has been found advantageous to convert nuclear fuels as completely as possible into $$UF_4—UO_2F_2—ThF_4$$

mixtures before dissolving in the melt; otherwise there is a high consumption of fluorine and the fluorination is impaired by dissolved oxides in the melt.

In accordance with the method of the invention the fluorinating treatment of the activated oxidic particles is carried out in two stages. The heat of reaction is thus distributed between two reaction steps. These reactions can be controlled better from the thermal point of view than a direct fluorination of the oxides. In the case of fluorination in the gaseous phase, there is less danger of the particles to be fluorinated sintering together to form lumps. The formation of uranium hexafluoride in accordance with the present method thus runs more rapidly than is the case with direct fluorination of the oxides (see also FIG. 2 of the drawing). It is also more complete under comparable conditions. A further advantage of the method in accordance with the invention of the direct fluorination is that substantially less quantities of elementary fluorine are necessary, more particularly when the treatment with gaseous hydrogen fluoride is made as complete as possible. Thus with a quite conventional uranium:thorium ratio of 1:20 the amount of fluorine to be used is less than 5% of the amount of fluorine to be used in the case of direct fluorination with elementary fluorine.

Uranium separation by fluorination in the molten phase has the following advantages over gaseous phase fluorination:

(1) The temperature of fluorination is lower,
(2) the time required for fluorination is substantially less,
(3) the driving out of the uranium is more complete, and
(4) owing to the high thorium concentration and the high density of the melts of 3 to 4 g. per cubic centimeter, the radioactive waste occurs in a more concentrated and compact form.

While for the conversion of uranium into the vapor phase as uranium hexafluoride by fluorination of a $UF_4$—$UO_2F_2$—$ThF_4$ mixture using elementary fluorine in a gaseous phase several hours are necessary, removal of the uranium in a system consisting of 10% LiF, 14.2% NaF, and 75.8% $UF_4$—$UO_2F_2$—$ThF_4$ occupies about 30 minutes. The uranium can be removed from such melts almost completely, that is to say so as to give residual contents less than 200 p.p.m.

In many cases it may be advantageous to add inert gases such as nitrogen, argon, or helium in carrying out the $O_2$/HF treatment of the hydrofluorination and/or the fluorination, in accordance with the invention. This leads to a more even temperature development being obtained.

The uranium hexafluoride escaping during fluorination in accordance with the invention is then removed from the reaction gases, f. i. by absorption-desorption on sodium fluoride, and purified.

The invention is now further described with reference to the following examples.

EXAMPLE 1

5.56 g. $UC_2/ThC_2$ (U:Th about 1:5), coated with PyC—SiC—PyC were reacted in a fixed bed Monel metal reactor at a reaction temperature of 700° C. for 6 hours with a mixture of 4 g. HF/h.+14 g. $O_2$/h. The reaction residue was free of SiC and carbon.

Following this the reaction residue was hydrofluorinated at 450° C. for 5 hours with 10 l. HF/h. and fluorinated for 3 hours at 700° C. with 8 l. $F_2/N_2$-(1:1) mixture/h. 99% of the uranium was recovered in the form of $UF_6$.

EXAMPLE 2

5 g. $UC_2ThC_2$ (U:Th about 1:5), coated with PyC—SiC—PyC were reacted in a fixed bed Monel metal reactor at a reaction temperatures of 700° C. for 4 hours with a mixture of 1 g. HF/h.+14 g. $O_2$/h. The reaction residue was free of SiC and carbon.

In a comparison test 5.23 g. $UC_2/ThC_2$ (U:Th about 1:5), coated with PyC—SiC—PyC were treated at a reaction temperature of 800° C. in a fixed bed reactor of Monel metal with oxygen and then hydrogen fluoride. The amount of $O_2$ was in each case 14 g./h. and the amount of HF was 10 g./h.

The reaction sequence was:

1 h. $O_2$-2 h. HF-½ h. $O_2$-1 h. HF-½ h. $O_2$-1 HF

Investigation of the reaction residue showed that only the outer PyC coating had reacted. The SiC coating was only attacked to a very slight extent while the second PyC layer and the carbide core were unchanged.

EXAMPLE 3

5.11 g. $UC_2/ThC_2$ (U:Th about 1:5), coated with PyC—SiC—PyC, were treated at a reaction temperature of 860° C. in a fixed bed reactor of Monel metal for 3 hours with 10 l. $O_2$/h. The outer PyC coating was burnt off. The reaction residue $UC_2/ThC_2$ (U:Th about 1:5), coated with SiC—PyC, was reacted in the same reactor at 700° C. for 3 hours with a mixture of 2 g. HF+14 g. $O_2$/h. The reaction product was free of SiC and carbon.

EXAMPLE 4

2.06 g. silicon carbide (particle size 100–400μ) were treated in a fixed bed reactor of Monel metal at a reaction temperature of 700° C. with a mixture of 2 g. HF and 14 g. $O_2$/h. After a reaction time of 4 hours, the silicon carbide had been practically quantitatively converted into the vapor phase and removed.

EXAMPLE 5

81 g. uncoated $UO_2/ThO_2$ particles, in which the weight ratio of uranium to thorium was about 1:20, were oxidised in a fixed bed reactor for 7½ hours at temperatures between 820 and 860° C. with 30 l. $O_2$/h. Subsequently the U-oxide/$ThO_2$ mixture was hydrofluorinated for 17½ hours at 455° C. with 20 l. HF/h. in a fixed bed reactor. The reaction to the corresponding fluorides proceeded to 98% of the theoretical extent.

For purposes of comparison 65 g. of the same uncoated $UO_2/ThO_2$ particles were hydrofluorinated, without previous treatment with oxygen, directly in a fixed bed reactor for 16 hours at 455° C. with 20 l. HF/h. The conversion of the oxides to the fluorides only proceeded to 16.5% of the theoretical extent.

EXAMPLE 6

Figure 1:
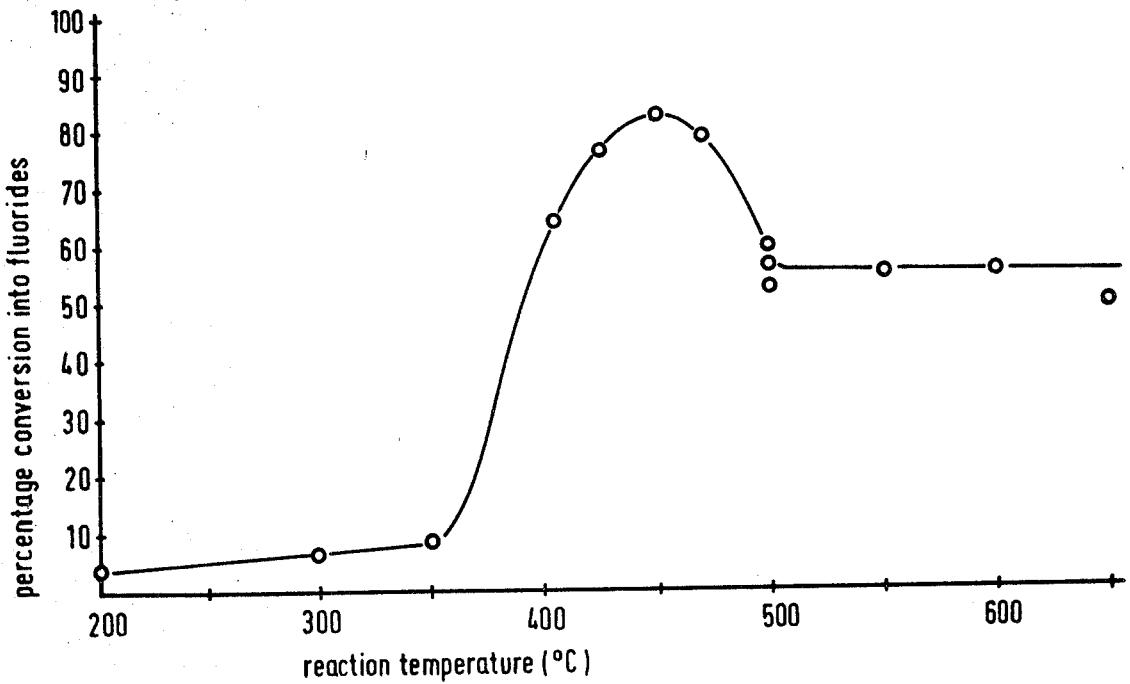

140 g. of $UO_2/ThO_2$ particles coated with carbon, in which the weight ratio of uranium to thorium was about 1:20, were treated in a fixed bed reactor for 8 hours with 20 l. $O_2$/h. at 840 to 870° C. Subsequently 5 g. of the U-oxide/$ThO_2$ mixture were hydrofluorinated in a fixed bed reactor with about 20 l. HF/h. for 5 hours at temperatures between 200 and 650° C. The graph of the accompanying FIG. 1 shows the relationship between the percentage fluorination of the final product and temperature. The graph indicates that the fluoride yield has a pronounced maximum at 450 to 460° C. At higher and lower temperatures there is a considerably smaller fluoride yield.

EXAMPLE 7

270 g. of $UO_2/ThO_2$ particles coated with carbon, in which the weight ratio of uranium to thorium was approximately 1:20, were treated in a fixed bed reactor for 8 hours at 820 to 880° C. using 60 l. $O_2$/h. About 65 g. of the resulting U-oxide/$ThO_2$ mixture were hydrofluorinated with 20 l. HF/h. at 455° C. for 15½ hours. The conversion of the oxides into the corresponding fluorides was about 97% of the theoretical amount of fluorination.

EXAMPLE 8

5 g. of the U/Th-fluoride mixture produced in the preceding Example 7 were fluorinated in a fixed bed reactor at temperatures between 300 and 700° C. for 3 hours using 4 l. $F_2$/h. The conversion of the uranium into the hexafluoride vapor phase is shown in FIG. 2 as a function of the reaction temperature.

For purposes of comparison 5 g. of the U-oxide/$ThO_2$ particles produced in Example 7, which had not been subjected to any HF treatment, were reacted in a fixed bed reactor at temperatures between 300 and 700° C. for 3 hours using 8 l. $F_2/N_2$ mixture per hour. The $F_2/N_2$ ratio was 1:1. The corresponding curve in FIG. 2 shows that a comparable conversion of uranium into the vapor phase as uranium hexafluoride only occurs at higher temperatures and that the quantity of the $UF_6$ formed is also substantially less at higher temperatures than the amount obtained by fluorination of the product previously treated with HF.

EXAMPLE 9

80 g. of U/Th-carbide particles coated with carbon, in which the weight ratio of uranium and thorium was approximately 1:5, were reacted with 20 l./h. $O_2/N_2$ mixture (the ratio being 1:1) at about 850° C. for 8 hours. Subsequently the residue left after this heat treatment was hydrofluorinated in a fixed bed reactor for 14 hours with 20 l. HF/h. at 455° C. 5 g. of the U/Th-fluoride mixture were then fluorinated with a 20 l./h. one to one $F_2/N_2$ mixture in a fluidized bed reactor at 700° C. 99.7% of the uranium was thus obtained in the form of $UF_6$.

EXAMPLE 10

81 g. uncoated $UO_2/ThO_2$ particles in which the weight ratio of uranium to thorium was about 1:20 were oxidised in a fixed bed reactor for 7½ hours at temperatures between 820 and 860° C. using l. $O_2$/h. Following this, the U-oxide/$ThO_2$ mixture obtained was hydrofluorinated with 20 l. HF/h. in a fixed bed reactor for 17½ hours at 455° C. The reaction produced an amount of fluorides corresponding to 98% of the theoretical amount.

The $UF_4$—$UO_2F_2$—$ThF_4$ mixture (denoted as $$(U/Th)F_4$$

in the accompanying table) was mixed, as indicated in the table, with proportions of lithium fluoride, lithium fluoride-sodium fluoride, sodium fluoride-potassium fluoride, sodium fluoride-zirconium fluoride and lithium fluoride-beryllium fluoride and the mixtures melted at temperatures between 550° C. and 650° C. A fluorine-nitrogen mixture was then introduced into 50 g. of each of the melts approximately at the fusion temperature of the respective melt. The fluorination was carried out in a cylindrical reactor of nickel, having a length equal to 80 mm. and a diameter of 30 mm. The conversion of uranium into the vapor phase was in most cases over 99% following the introduction of the fluorine-nitrogen mixture.

1 g./h. for hydrogen fluoride and 14 g./h. oxygen suffice to remove a PyC—SiC—PyC coating from 5 g. of coated fuel within a time lasting 4 hours at 700° C. The comparison example indicates, on the other hand, that in the case of nonsimultaneous use of hydrogen fluoride and oxygen the desired success does not occur. Example 3 demonstrates that it is possible to remove firstly the outer PyC coating by combustion with oxygen and then treat the residue in accordance with the invention with a mixture of oxygen and hydrogen fluoride. Example 4 indicates that in the case of the absence of free carbon, silicon carbide is completely converted into the vapor phase using a mixture of hydrogen fluoride and oxygen. The further examples indicate that in the case of the absence of a SiC layer or coating treatment can be carried out with oxygen and hydrogen fluoride sequentially.

We claim:

1. A method for recovering uranium as uranium hexafluoride from a nuclear fuel containing from 2 to 20% by weight of uranium and a substantial excess thereover of thorium, comprising the steps of (1) reacting the nuclear fuel at a temperature of at least 500° C. with a mixture of oxygen and gaseous hydrogen fluoride containing between 0.5 and 90% by weight hydrogen fluoride, (2) further reacting the nuclear fuel with gaseous hydrogen fluoride at a temperature of 400 to 700° C. to effect at least 60% by weight conversion of the uranium and thorium content of the fuel to $UF_4$—$UO_2F_2$—$ThF_4$, and (3) volatilizing the uranium as uranium hexafluoride by reaction with elementary fluorine at a temperature of 500 to 750° C.

2. A method in accordance with claim 1, in which the reaction of the fuel with the mixture of oxygen and gaseous hydrogen fluoride in step (1) is carried out at a temperature between 600 and 800° C.

3. A method in accordance with claim 1, in which the nuclear fuel has a coating of pyrocarbon or silicon carbide.

4. A method in accordance with claim 1, in which the nuclear fuel has coatings of pyrocarbon and silicon carbide.

5. A method in accordance with claim 1, in which the oxygen-hydrogen fluoride gaseous mixture contains 5 to 25% by weight hydrogen fluoride.

6. A method in accordance with claim 4, in which the nuclear fuel is in the form of particles having a size less than 1 mm. before treatment with the oxygen-hydrogen fluoride mixture.

7. A method in accordance with claim 1, in which the reaction with elementary fluorine takes place at a temperature between 600 and 750° C.

8. A method in accordance with claim 1, in which the treatment with gaseous hydrogen fluoride in step (2) is carried out at a temperature between 400 and 500° C. and the hydrogen fluoride used is mixed with an inert gas.

9. A method in accordance with claim 1, in which before reaction with elementary fluorine is carried out, the converted fuel is dissolved at temperatures between 600 and 650° C. in a melt of a mixture thereof with an alkali metal fluoride.

10. A method in accordance with claim 9, in which the alkali metal fluoride comprises at least one material se-

TABLE

| Composition of fluoride melt, percent by weight | Reaction temperature (° C.) | $F_2$ l./h. | $F_2:N_2$ mixing ratio | Duration of reaction (hours) | Uranium in U/Th fluorides used (percent) | Uranium in melt after fluorination (percent) | Conversion of uranium into vapor phase (percent) |
|---|---|---|---|---|---|---|---|
| LiFi (16.9); (U/Th)$F_4$ (83.1) | 610 | 12 | 2:1 | 1 | 3.56 | 0.022 | 99.3 |
| LiF (11.8); NaF (4.7); (U/Th)$F_4$ (83.5) | 570 | 12 | 1:1 | 1 | 3.55 | 0.017 | 99.4 |
| LiF (10.0); NaF (14.2); (U/Th)$F_4$ (75.8) | 570 | 12 | 2:1 | 0.5 | 3.61 | 0.009 | 99.7 |
| LiF (10.0); NaF (14.0); (U/Th)$F_4$ (76.0) | 610 | 12 | 2:1 | 2 | 13.9 | 0.007 | 99.9 |
| NaF (25.5); KF (3.0); (U/Th)$F_4$ (71.5) | 600 | 12 | 1:1 | 1 | 3.55 | 0.015 | 99.4 |
| NaF (30.1); Zr$F_4$ (3.9); (U/Th)$F_4$ (66.0) | 650 | 12 | 2:1 | 3 | 3.58 | 0.024 | 99.0 |
| LiF (25.7); Be$F_2$ (10.0); (U/Th)$F_4$ (64.3) | 550 | 12 | 2:1 | 3 | 3.76 | 0.07 | 97.0 |

The examples show that with a simultaneous treatment of the coating with hydrogen fluoride and oxygen silicon carbide and carbon are removed quantitatively (Example 1). Example 2 indicates that rates of supply as low as lected from the group consisting of lithium fluoride, sodium fluoride, lithium-potassium fluoride, lithium-sodium fluoride, sodium-potassium fluoride and lithium-sodium-potassium fluoride.

11. A method in accordance with claim 10, in which the melt contains a minor quantity of a material selected from the group consisting of zirconium fluoride, beryllium fluoride and zinc fluoride.

12. A method in accordance with claim 9, in which the elementary fluorine is mixed with an inert gas.

13. A method in accordance wtih claim 12, in which the inert gas is selected from the group consisting of nitrogen, argon and helium.

14. A method in accordance wtih claim 1, in which the reaction with oxygen and gaseous hydrogen fluoride in step (1) is carried out in the presence of an inert gas and a solid diluting agent.

15. A method in accordance with claim 1, in which the reaction with elementary fluorine is carried out in the presence of an inert gas and a solid diluting agent.

16. A method for recovering uranium as uranium hexafluoride from nuclear fuel containing from 2 to 20% by weight of uranium and a substantial excess thereof of thorium in the form of uncoated ceramic oxide or carbide particles, comprising the steps of reacting the fuel at a temperature between 500 and 1200° C. with oxygen, further reacting the fuel at a temperature between 400 and 700° C. to effect at least 60% by weight conversion of the uranium and thorium content of the fuel to $UF_4$—$UO_2F_2$—$ThF_4$ using gaseous hydrogen fluoride, and then volatilizing the uranium as uranium hexafluoride by reaction with elementary fluorine at a temperature of 500 to 750° C.

17. A method in accordance with claim 16, in which the treatment with oxygen takes place at a temperature between 700 and 1000° C.

18. A method in accordance with claim 16, in which before reaction with elementary fluorine is carried out, the converted fuel is dissolved at temperatures between 500 and 650° C. in a melt of a mixture thereof with an alkali metal fluoride.

19. A method in accordance with claim 18, in which the alkali metal fluoride comprises at least one material selected from the group consisting of lithium fluoride, sodium fluoride, lithium-potassium fluoride, lithium-sodium fluoride, sodium-potassium fluoride and lithium-sodium-potassium fluoride.

20. A method in accordance with claim 19, in which the melt contains a minor quantity of a material selected from the group consisting of zirconium fluoride, beryllium fluoride and zinc fluoride.

21. A method in accordance with claim 18, in which the elementary fluorine is mixed with an inert gas selected from the group consisting of nitrogen, argon and helium.

References Cited

UNITED STATES PATENTS

| | | | |
|---|---|---|---|
| 2,907,630 | 10/1959 | Lawroski et al. | 23—352 |
| 3,009,768 | 11/1961 | Adams et al. | 23—352 |
| 3,098,709 | 7/1963 | Mecham et al. | 23—326 |
| 3,208,815 | 9/1965 | Bourgeois et al. | 23—326 |
| 3,260,574 | 7/1966 | Hatch et al. | 23—352 |
| 3,275,422 | 9/1966 | Cathers et al. | 23—325 |
| 3,294,492 | 12/1966 | Bartlett et al. | 23—324 |
| 3,303,004 | 2/1967 | Bennett et al. | 23—324 |

FOREIGN PATENTS

| | | | |
|---|---|---|---|
| 933,500 | 8/1963 | Great Britain | 176—91 |

CARL D. QUARFORTH, Primary Examiner

F. M. GITTES, Assistant Examiner

U.S. Cl. X.R.

423—5, 9, 253, 258, 259